United States Patent
Borgen et al.

(10) Patent No.: US 6,923,693 B2
(45) Date of Patent: Aug. 2, 2005

(54) SYSTEM FOR UTILIZATION OF SINUS-SHAPED MOTION PATTERN

(75) Inventors: Jan Erik Borgen, Oslo (NO); Claus Christian Apneseth, Glasgow (GB); John Riis, Son (NO)

(73) Assignee: Inocean AS, Oslo (NO)

( * ) Notice: Subject to any disclaimer, the term of this patent is extended or adjusted under 35 U.S.C. 154(b) by 0 days.

(21) Appl. No.: 10/490,448

(22) PCT Filed: Sep. 24, 2002

(86) PCT No.: PCT/NO02/00337

§ 371 (c)(1),
(2), (4) Date: Mar. 24, 2004

(87) PCT Pub. No.: WO03/026954

PCT Pub. Date: Apr. 3, 2003

(65) Prior Publication Data

US 2004/0266278 A1 Dec. 30, 2004

(30) Foreign Application Priority Data

Sep. 25, 2001 (NO) .......................................... 2001 4663
May 13, 2002 (NO) .......................................... 2002 2273

(51) Int. Cl.⁷ ............................................... B63H 1/36
(52) U.S. Cl. ....................................................... 440/15
(58) Field of Search ...................................... 440/13–15

(56) References Cited

U.S. PATENT DOCUMENTS

| | | | | |
|---|---|---|---|---|
| 856,338 A | * | 6/1907 | Crosby | ................... 114/144 R |
| 3,035,536 A | | 5/1962 | Archer | |
| 4,050,395 A | | 9/1977 | Anderson | |
| 5,740,750 A | | 4/1998 | Triantafyllou | |
| 6,138,604 A | | 10/2000 | Anderson | |
| 6,746,287 B2 | * | 6/2004 | Yamamoto et al. | ........... 440/15 |

FOREIGN PATENT DOCUMENTS

| | | |
|---|---|---|
| DE | 301446 | 5/1915 |
| EP | 0035346 | 9/1981 |
| JP | 56157693 | 4/1981 |
| JP | 61278487 | 9/1986 |
| WO | WO 00/17519 | 3/2000 |

* cited by examiner

*Primary Examiner*—Jesus D. Sotelo
(74) *Attorney, Agent, or Firm*—Christian D. Abel (57) ABSTRACT

The invention relates to a system for utilization of a sinusoidal pattern of movement for propulsion or energy recovery. The system comprises a plurality of rigid hull elements, completely or partly submerged, arranged in a row, rotatably attached to one another for rotation about parallel axes of rotation across the longitudinal dimension of the row of hull elements. The system further comprises movement devices for rotating the hull elements relative to one another or movement devices for recovery of energy as a result of rotating the hull elements relative to one another.

14 Claims, 5 Drawing Sheets

SYSTEM FOR UTILIZATION OF SINUS-SHAPED MOTION PATTERN

The invention relates to a system for utilisation of a sinusoidal pattern of movement for propulsion or energy recovery.

Boats, ships, submarines, etc. are normally driven forward by the movement of a propeller or a water jet. The force that drives these devices is usually derived from a combustion engine, which has a repeating translatory movement that is converted to rotation by means of a crank. In the present system of today, the losses occur both in the machinery and in the actual transmission to the water. All the current propeller solutions have a restricted speed window in which they are efficient. The principle behind propeller operation and water jets is to give a small volume of water a high velocity for propulsion of the boat, ship, etc. Another problem with the traditional propulsion system is that there is inertia in the system and it has a relatively large turning circle.

In order to achieve greater efficiency in propulsion machinery, attempts have been made to copy the pattern of movement of water-dwelling species. Examples of this are the imitation of the pattern of movement of a tuna fish, where the pattern of movement provides propulsion for the automotive unit in U.S. Pat. No. 6,138,604. In this publication a freely swimming vessel is described with a rigid front part and a flexible rear part. The front part has a given volume and comprises a watertight chamber. The rear part has a smaller volume than the front part and comprises manoeuvring and propulsion systems, where a power unit moves the rear part with a sinusoidal motion. For its propulsion, a living tuna fish utilises movement of the body in a half wavelength. The movement of the rear part of the vessel in U.S. Pat. No. 6,138,604 is achieved by means of movement of hinged rigid rods by means of hydraulic cylinders, where the rigid rods are connected in such a fashion that they form a structure corresponding to a spine, in the rear part of the vessel. The unit's rear part is made of a flexible material. This kind of flexible material is relatively expensive, and a structure of this kind is therefore not particularly suitable for larger dimensions. The vessel also has a "spine" of hinged rigid rods. This will occupy a great deal of space in the vessel, thus making it unsuitable, for example, for transport purposes. The vessel is also designed to exploit the pattern of movement in a half wavelength. Another example of a propulsion device like this is given in DE 301446, where the rear part of the fishlike structure consists of elements connected with a central "spine" for making the relative movements between the elements.

In JP 56157693 and JP 61278487 systems are disclosed for propulsion of boats where the boats consist of several parts, which are moved relative to one another for propulsion of the boat with rotation about horizontal axes. With a boat design of this kind, wave motion, which is not caused by waves, will be felt on the deck of the boat, and this is not particularly desirable.

For energy recovery of wave motion there are wave-power devices consisting of a mat-like structure that is floated on the surface of the water. The mat-like structure consists of several articulated elements, which exploit relative rotational movement between the elements for generating energy. An example of this is described in EP 0035346. However, the utilization of wave energy is a fundamentally different working principle compared with the utilization of an energy in a unidirectional flowing fluid. In order to utilise underwater currents and wind currents, rotating devices such as, for example, turbines are generally used for recovery of energy in the flowing fluid mass. A drawback with these devices is that they usually have a relatively narrow operational window in which they are effective, and if the flow rate is too low or too high, it will not be possible to use them. For recovery of energy in flowing bodies of water, such as wave power, the devices also have to be capable of withstanding great-stress variations.

U.S. Pat. No. 5,740,750 describes a method and device for reducing the resistance for a body moving through a fluid. The body's propulsion is preferably achieved by a propulsion foil attached to the rear part of the body, but other known propulsion devices may also be employed. Reduction of the resistance for the body is achieved by reducing the turbulence along the body. This is achieved by making at least the rear third of the body flexible, thus causing it to set up a lateral wave-like motion, with a wavelength between 0.0.5 and 2.0 times the length of the body. The aforementioned wave motion causes the water pressure against the body to increase, thus maintaining laminar flow along the body.

There are several problems associated with a solution like that described in U.S. Pat. No. 5,740,750. Where a foil is used that has a translatory and rotating motion for creating propulsion, all forces have to be absorbed in a small attachment point for the foil. Since relatively slow movements with a frequency of between 0.1 and 0.5 Hz are involved here, this means that enormous stresses will be created in the transition between the body and the propulsion foil. A second problem is that the body has to be tapered towards the rear in order to reduce the lateral forces, which otherwise would destroy the directional stability at wavelengths other than whole multiples of wavelengths. This gives the structure a complicated shape with oval compartments that are difficult to use for stowing payload. Another problem is that in the solution in U.S. Pat. No. 5,740,750 an articulated skeleton structure (spine) is used, and covered by a flexible skin. This creates problems in cases where the structure requires to be scaled up, nor is the body particularly suitable for deep water due to the pressure problem. A spine also gives less space for stowing payload.

All these prior art systems have major drawbacks, there is the problem with a central spine, which reduces the ability to stow cargo or other equipment, there is the problem with structures not adaptable to really high pressures when utilizing the system at large water depths, there is also the problem with variable cross section over the length of the element which makes them more difficult to produce and use for cargo etc.

The object of the present invention is to provide a system for utilising a sinusoidal pattern of movement for propulsion or energy recovery, where this is achieved by providing a device where the propulsion or energy recovery are created by moving large volumes of fluid at low speed in contrast to a more traditional propulsion device where a small quantity of fluid is moved at high speed, which is the principle of a propeller. This will provide increased efficiency for the propulsion or the energy recovery.

It is a further object to provide a device where the load on individual parts is evenly distributed over the structure, and where the construction may have a substantially constant cross section along the entire length, with the result that the construction may consist of links essentially identical in shape, where it is easy to utilise the volume since it does not change substantially over the length of the structure.

Yet another object is to provide a device that can be scaled up in size, made watertight and used for higher pressure, in addition to which the inner space in the structure can be used mainly for payload.

It is also an object of the present invention to provide a device, which can easily be adapted in length for the application concerned.

It is also an object of the present invention to provide a system for recovery of energy in a slow-flowing fluid that is more efficient than traditional propeller systems.

The object of the invention is achieved by the features of the systems set forth in independent claim 1 and independent claim 2. Additional features are set forth in the dependent claims.

The invention relates to a system for utilisation of a sinusoidal pattern of movement for propulsion or energy recovery, where the system comprises a plurality of rigid hull elements arranged in a row. The hull elements are rotatably interconnected for rotation about parallel axes of rotation across the length of the row of hull elements. The row of hull elements may be completely or partly submerged depending on the area of application for the row. A row of hull elements for energy recovery from an ocean current will typically be completely submerged, but a surface ship may also be envisaged composed of the hull elements according to the invention. In order to achieve propulsion the system comprises movement devices for rotating substantially the whole row of hull elements relative to one another or as a reversed system the movement devices are employed for recovery of energy as a result of rotation of substantially the whole row of hull elements relative to one another.

The system's sinusoidal pattern of movement is created by means of angular change between the hull elements. The sinusoidal movement is preferably created in a plane substantially parallel to the surface of the water and the row of hull elements forms a complete sinus wave.

In contrast to normal propulsion of a vessel by means of water jet or propeller, the principle of which propulsion system is to move a small quantity of water at high speed in order to achieve propulsion, the propulsion achieved with the present invention is obtained by moving large volumes of water slowly. This permits 85–90% of the energy to provide propulsion while in normal propulsion systems, such as a propeller, the percentage is around 70.

Instead of generating propulsion, the system according to the invention may be used in reverse for recovery of energy in a flowing fluid. It is precisely because the system is based on the movement of large volumes at low speed that it is suitable for recovery of energy in fluid flows, such as ocean currents. In the case of an ocean current, for example, the axis of rotation for the hull elements will preferably be oriented substantially vertically.

The invention will now be explained with references to embodiments and drawings, in which.

Figure 1:
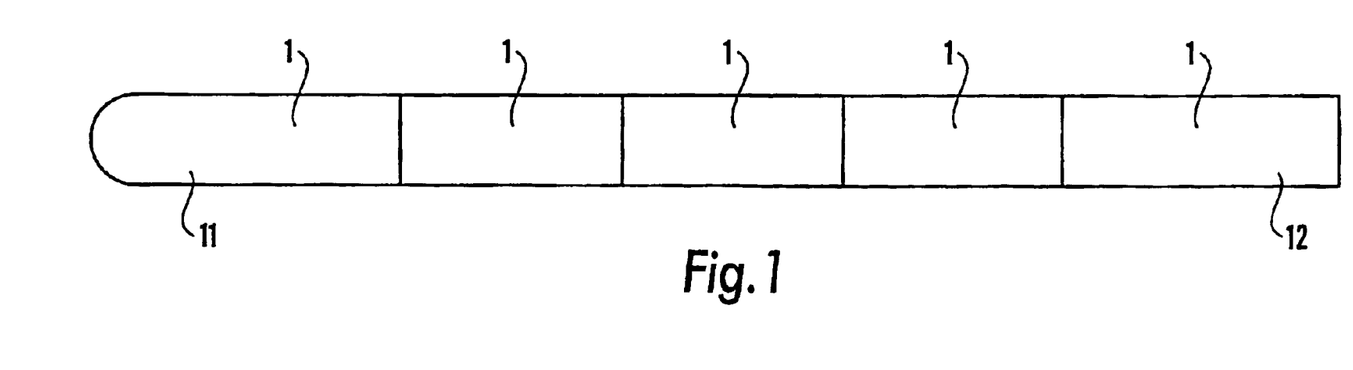
FIG. 1 is a principle drawing of a row of hull elements, which form a row according to the invention, viewed from the side.
Figure 2:
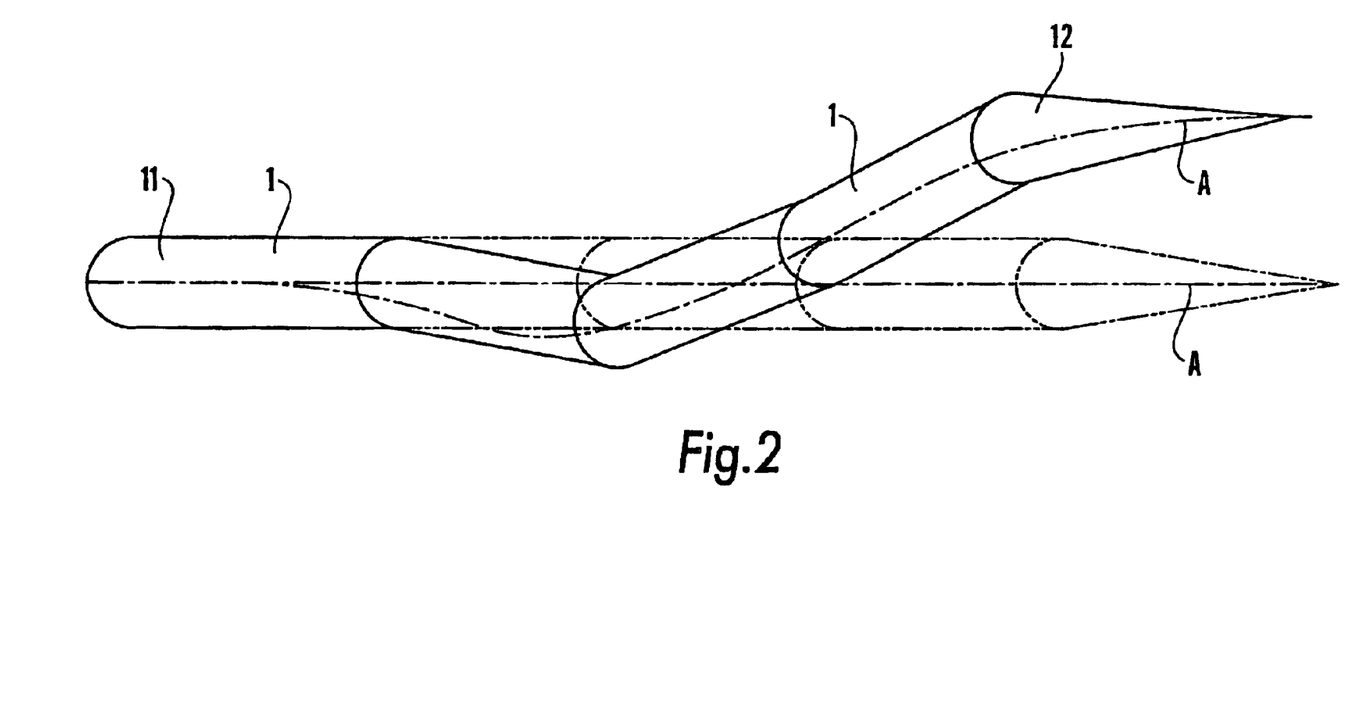
FIG. 2 depicts principle drawings of a row of hull elements according to the invention viewed from above, forming a straight and a sinusoidal row.

The invention relates to the utilisation of a sinusoidal pattern of movement for propulsion or energy recovery. In order to utilise a sinusoidal pattern of movement, a row of rigid hull elements are interconnected. FIG. 1 illustrates an example of such hull elements 1 assembled to form a row with a front hull element 11 and a rear hull element, a tail 12. The hull elements 1 have rigid sides with an open space inside, thus forming a shell structure. The hull elements as illustrated in FIGS. 1 and 2 are essentially rectangular, but other shapes may be envisaged. The cross sectional shape of the row across the longitudinal dimension of the row may, for example, be more triangular, polygonal or oval, or alternatively circular or somewhat varied over the length of the row. The hull elements have a width across the row, a length in the longitudinal direction of the row and a height in a direction substantially parallel with the axes of rotation.

The hull elements 1 are rotatably attached to one another for rotation about parallel axes of rotation across the longitudinal dimension of the row. Active rotation of the hull elements about the axes of rotation is implemented by means of movement devices 2. When the hull elements are used for energy recovery, the rotating device at the links will convert the rotational energy to usable energy.

As illustrated in FIG. 2, rotation of the hull elements relative to one another can give a sinusoidal shape to a centre line A drawn through the middle of the hull elements. By controlling the rotation of the hull elements, a repeating sinusoidal movement will be created over the row of hull elements. The row of hull elements preferably forms a complete sinus wave over its length. Controlling the angular change between the hull elements will also control the amplitude swing, i.e. the lateral movement of a point on the centre line A from the starting point, which is a straight centre line A. By this means equal amplitude can be obtained for all points along the centre line A or the points along the centre line A can have greater amplitude for the rear parts of the row and the greatest amplitude for the tail. This increase in amplitude swing may be linear or exponential. The last element in the row of hull elements 1, the tail 12, preferably has an oscillation amplitude corresponding to between 6 and 20% of the length of the row of hull elements. The amplitude swings across the row are advantageously ±5 degrees at the first link in the row of hull elements and ±30 degrees at the last link in the row.

The number of hull elements in the row may be varied depending on the area of application, where the row preferably comprises 2–10 elements, a preferred number being 6–8. In the embodiment in FIGS. 1 and 2 a row is illustrated with five hull elements.

The length of the hull elements may also be varied across the row, the front element 11 being the longest and the length subsequently decreasing towards the back of the row, either evenly distributed or in groups. The tail in turn may be made longer. This may be advantageous, for example, in cases where an exponential increase is required in the amplitude swing for the hull elements across the row.

The front hull element 11 in the row is generally more rounded at the end facing the direction of travel or the direction of flow. The front hull element may also be in the form of the bow of a boat. The last element 12, the tail, may well be tapered in shape. This is in order to obtain the best possible flow pattern round the propulsion system.

The connection between the hull elements may be implemented in a number of ways with trunnions and grooves, hinges, pivots, etc. It is advantageous to obtain an outer surface where there is a smooth transition from the surface of one hull element to the surface of the succeeding hull element. A smooth transition will have the least possible influence on the flow pattern round the row of hull elements. Such a transition can be achieved by means of the method of attachment of the hull elements or by a more flexible cover over the link joint where one end of the cover is attached to a hull element, while the opposite side abuts against an adjacent hull element.

Figure 3:
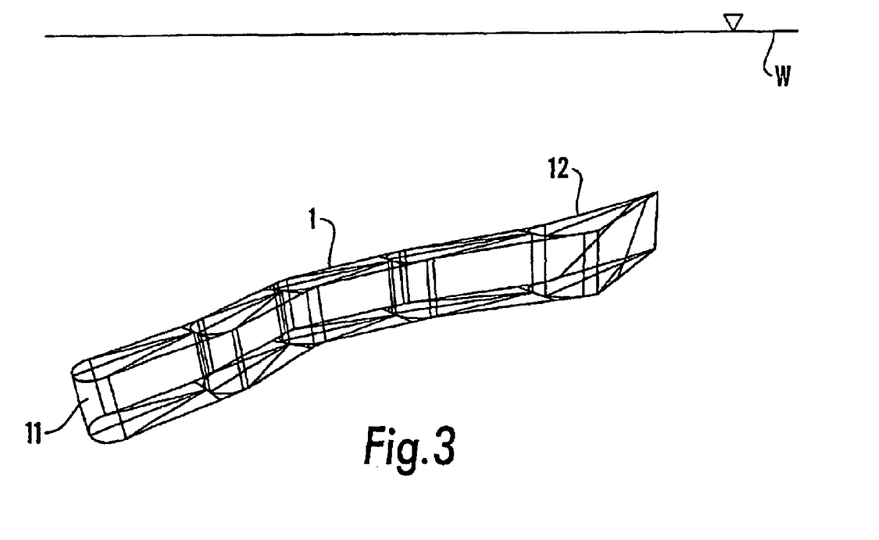
FIG. 3 is a perspective view of a row of hull elements constituting a submerged vessel.

In FIG. 3 an embodiment of the invention is illustrated where the row of hull elements forms an autonomous vessel that operates under water. Such a vessel will comprise at least one watertight chamber, and energy for operating the movement devices will naturally come from batteries or a motor. In such a vessel it will be natural to provide one movement device for each link with a control unit, thus enabling the vessel to be moved in the desired direction, i.e. straight ahead, turning or turning around depending on the angular change between the hull elements. The hull elements in such a vessel will not be watertight. Any equipment that is not waterproof can be placed in watertight chambers. The vessel will also comprise buoyancy bodies, which may also be employed for vertical orientation of the vessel in the water. Depending on the application, such a vessel will also be equipped with sensors, storage media and possibly devices for transmitting/receiving data to/from the surface. If it is expedient, the vessel may also be equipped with lines and transmission lines to the surface and perhaps also extra propulsion machinery in the form of a propeller or the like.

Figure 4:
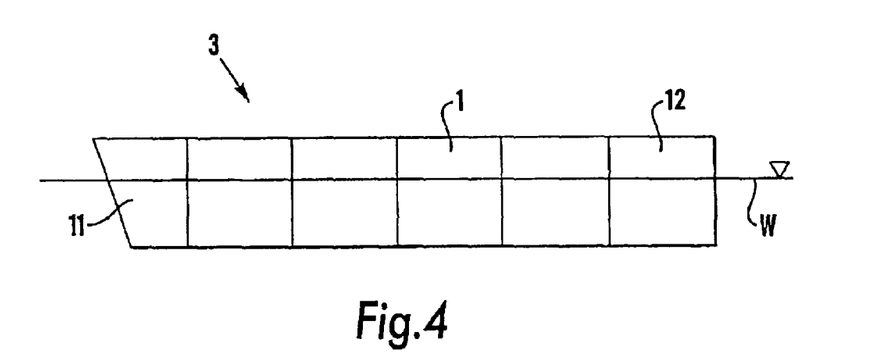
FIG. 4 is a principle drawing where the row of hull elements according to the invention constitutes a vessel.

FIG. 4 illustrates that the hull elements according to the invention can also form a surface vessel.

Figure 5:
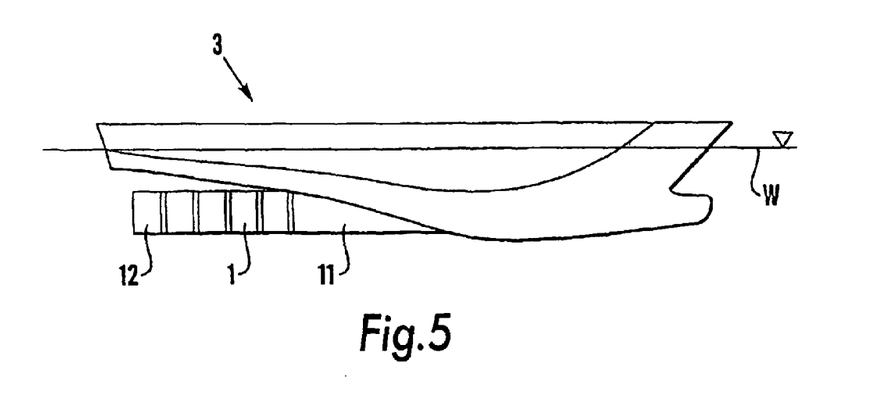
FIG. 5 depicts principle drawings where the row of hull elements according to the invention constitutes a propulsion system for a vessel.

FIG. 5 illustrates that the hull elements according to the invention can form the propulsion mechanism for a vessel. In this case the row of hull elements is attached rotatably to the vessel under the rear half, with the result that, when the hull elements are given a sinusoidal pattern of movement, this movement drives the vessel forwards. If the row of hull elements is rotatably attached to the vessel, the whole row can be rotated in order to rotate the vessel's direction of travel, instead of it being the relative angular differences between the hull elements that rotate the vessel. The row of hull elements may be located under or behind the vessel, or for a catamaran, for example, between the hulls. With regard to running aground and bringing into dock, etc., it is desirable for the row of hull elements to be arranged over a bottom line for the vessel's hull and within the extremities of the hull. It may also be envisaged that other propulsion equipment such as a propeller may be installed on the vessel.

Figure 6:
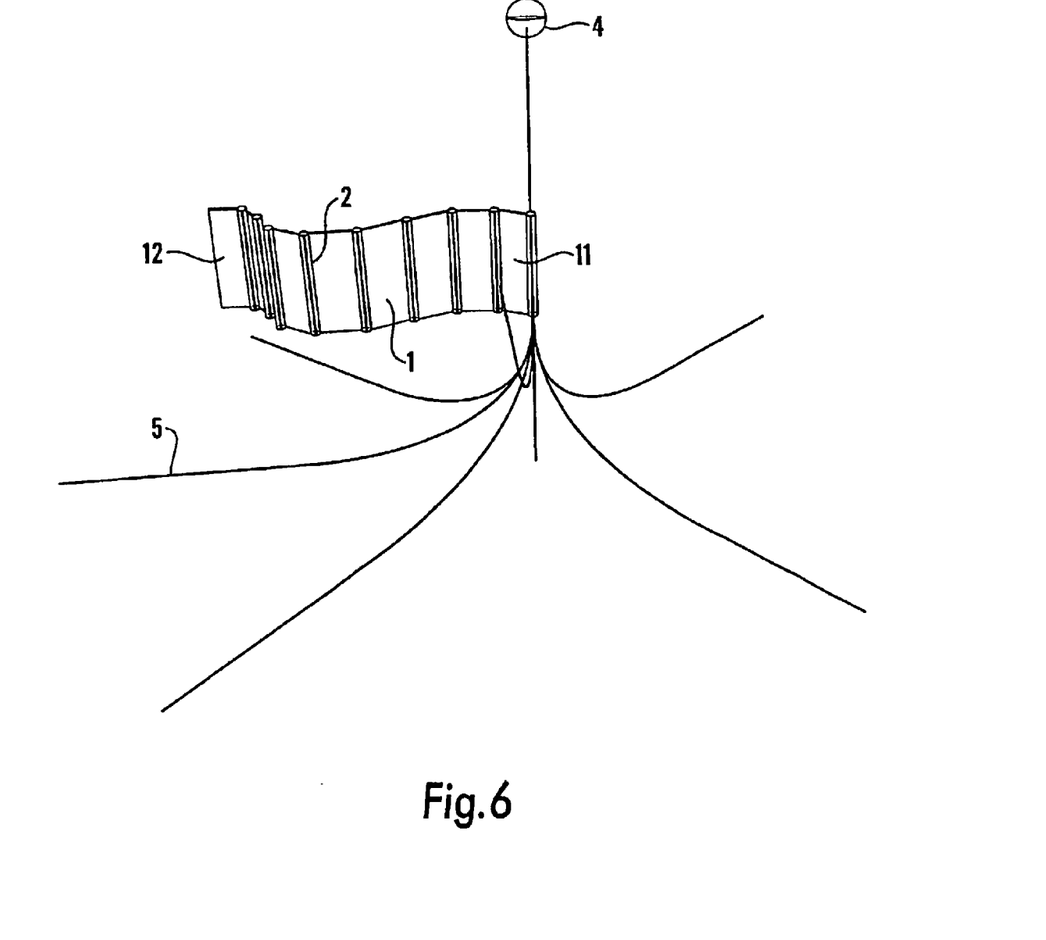
FIG. 6 is a principle drawing where the row of hull elements according to the invention is employed as a power generator in a flowing fluid.

In FIG. 6 an embodiment is illustrated where a sinusoidal pattern of movement for the row of hull elements is used for recovery of energy from a fluid flow. Such a fluid flow, where the fluid is water, may be a tidal flow, the mouth of a river, flows resulting from waves or ocean currents. In the embodiment in FIG. 6 the front hull element 11 is attached to a movable anchor point by mooring lines 5 and a buoy 4. In this embodiment the row of hull elements consists of nine hull elements. The pattern of movement of the hull elements creates a sinus wave in a substantially horizontal plane. In this embodiment for recovery of energy, the hull elements, which have a width across the row in a substantially horizontal direction, a length in the longitudinal direction of the row and a height across the row in a substantially vertical direction, have been given a minimal width and a height greater than the length. This is to ensure that they occupy as little space as possible in the water flow while receiving the greatest possible influence from the water flow.

The invention employed for recovery of energy in a flowing fluid may be designed in several ways. The first element in the row may be securely anchored to the bottom by an anchor chain, a post or other suitable installation, or, for example, to a floating platform, a submerged buoy or a cement foundation on the bottom. The hull elements themselves can provide the buoyancy for the device and/or it may have buoyancy chambers when it is placed in water. Alternatively or in addition, the hull elements may be weighted if they are anchored, for example, to a submerged buoy. The device may also be envisaged placed in a fluid flow where the fluid is a gas such as air. In this case the weight of hull elements and movement devices becomes a crucial factor.

The movement device which influences or is influenced by the angular change between the hull elements in the row may be designed in many different ways. Some of these designs are illustrated in FIGS. 7–12. These movement devices are adapted in such a manner that they are supplied with energy in order to establish angular changes between the hull elements when the row of hull elements has to create propulsion or they can generate energy as a result of angular changes when the row of hull elements is used for energy recovery. The energy supplied to the movement device may come from a suitable source depending on the use of the system.

Figure 7:
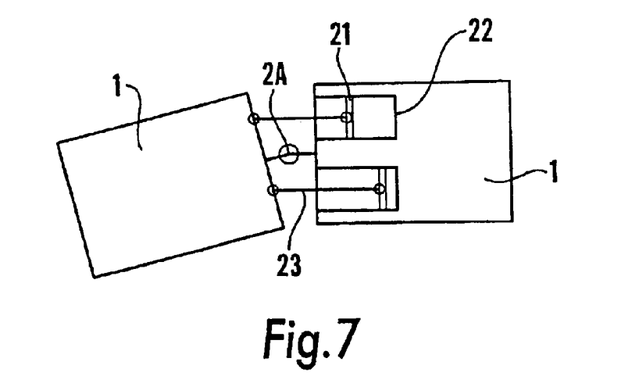
FIGS. 7–10 illustrate various embodiments of movement devices at the links between the hull elements viewed from above.

In FIG. 7 movement devices are illustrated consisting of pistons 21, piston cylinders 22 and transmission arms 23. At a link 2*a* between two hull elements 1, on each side of the link with the axis of rotation, there is placed a piston with piston cylinder and transmission arm, where the piston cylinder with the piston working within it is attached to one hull element and where the transmission arm is rotatably attached to the piston and the second hull element. On adjustment of the pistons' position in the piston cylinder, this offers the possibility of adjusting the angular motion between the two hull elements. The piston cylinders with pistons may be single or double acting. In the case of double-acting pistons the movement device may consist of only one piston/piston cylinder. For recovery of energy, the movement of the pistons in the piston cylinders as a result of the angular change is employed for generating energy.

Figure 8:
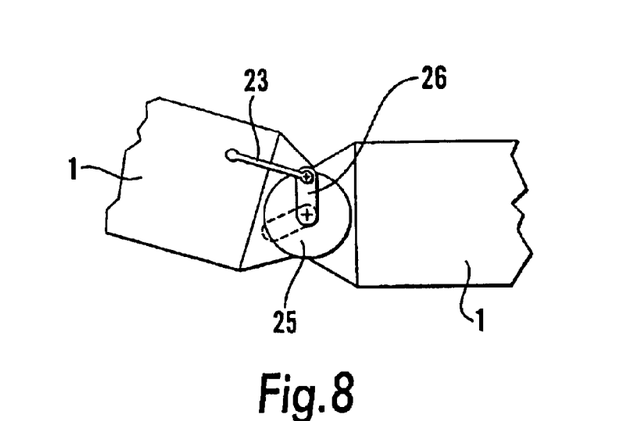

In FIG. 8, a second embodiment of the movement device is illustrated, consisting of a motor 25, an eccentric arm 26 and a transmission arm 23. The motor is of any suitable type and has the eccentric arm 26 mounted in its point of rotation. The transmission arm 23 is rotatably attached to the eccentric arm 26 at a distance from the eccentric arm's 23 point of rotation. By controlling the motor's rotation, control can be achieved of the angular change between the hull elements. By means of externally applied angular change between the hull elements, it will be possible to generate energy as a result of the eccentric arm's 26 rotational motion.

Figure 9:
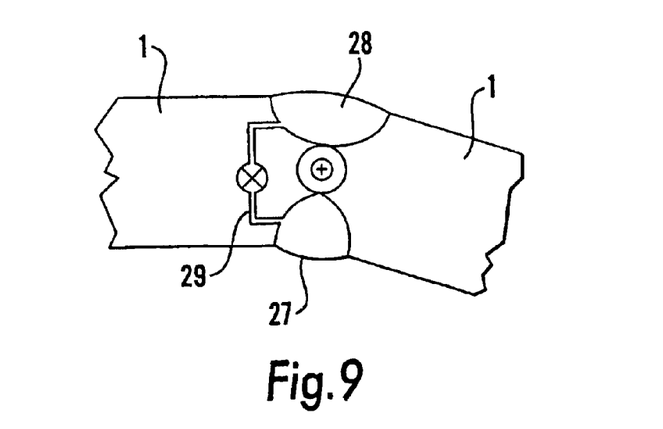

A further embodiment of the movement device is illustrated in FIG. 9. In this embodiment the movement device consists of two bellows 27 arranged on each side of the link between two hull elements 1. The bellows 27 and lateral surfaces in the two hull elements form a pressure chamber 28, which is connected, for example, to a two-way pump 29. By regulating the pump and thereby the pressure in the two pressure chambers on each side of the link, the angular change between the hull elements can be regulated. In the case of energy recovery, instead of a pump, a turbine or other equipment for recovery of energy may be provided which employ the altering of the pressure differences between the two chambers.

Figure 10:
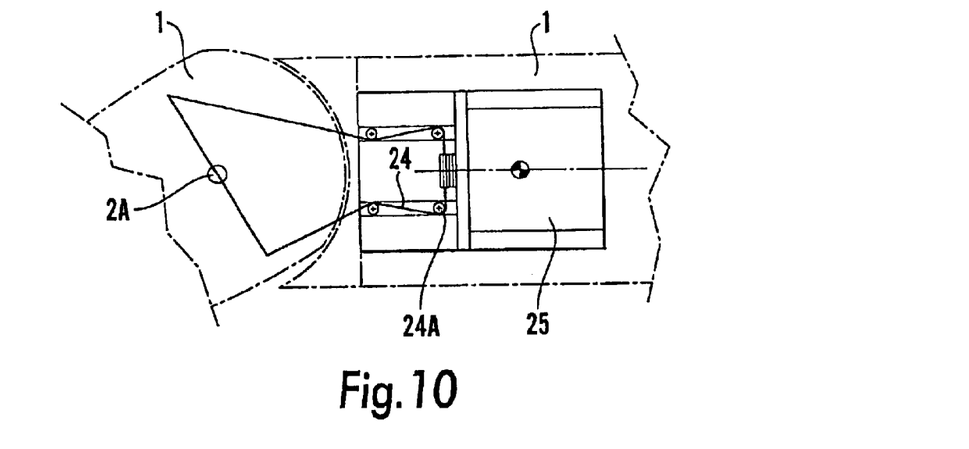
Figure 11:
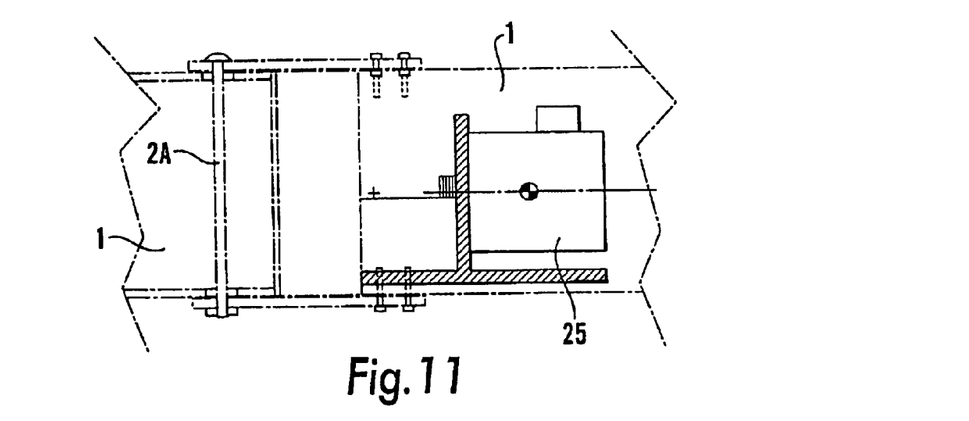
FIG. 11 illustrates the solution indicated in FIG. 10 viewed from the side.

A further example of a movement device is illustrated in FIGS. 10 and 11, where FIG. 11 illustrates the device in FIG. 10 viewed from the side. The movement device in this embodiment consists of a motor 25, a wire 24 and four castors 24A. By placing the wire over the castors in such a manner that movement of the wire 24 by means of the motor 25 in one direction results in angular displacement between the hull elements in one direction, and conversely for angular change in the other direction, adjustable angular change can be obtained between the hull elements. Instead of wire the use may be envisaged of other elongated elements such as a chain, etc. A different number of castors may also be envisaged. The position of the castors will depend on the number and desired relative movement of the wire 24 in relation to the angular displacement between the hull elements. For energy recovery, the wire movement generates energy.

As an alternative to the above-mentioned examples, the use may be envisaged of toothed wheel transmission for the movement device for regulating the angular motion between the hull elements.

Figure 12:
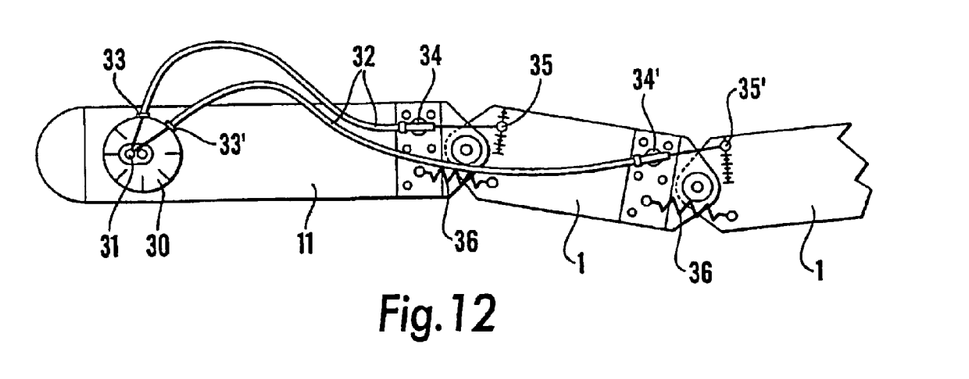
FIG. 12 illustrates an alternative embodiment of the movement devices for the links between the hull elements viewed from above.

In FIG. 12 there is illustrated a movement device, which may be employed in cases where a predetermined angular change is required between the different hull elements in the row. Such an embodiment of the movement device 2 may be employed, for example, when the row of hull elements 1 is required to create propulsion straight ahead, or energy recovery in a steady fluid flow. The movement device 2 consists of a motor 30 located at the front link 11. The motor 30 has an eccentric arm 31 mounted in a point of rotation. Furthermore, several wires 32 are mounted at a distance from the eccentric arm's 31 point of rotation. There is a wire 32 for each hull element 1 in the row after the first hull element 11. From the mounting point in the eccentric arm 31, the wires 32 are each passed through a phase guide 33, where the phase guides 33, 33' are located at regular angular distances in a 360 degree circle round the motor 30 and the eccentric arm 31. From the phase guide 33 the wire 32 is passed to the link between the two hull elements 1 that it is intended to regulate. At the link the wire 32 is arranged in a guide 34 on the front hull element 1 in the link and attached to a fastening device 35 on the second hull element 1. The angular movement between all the hull elements in the row can thereby be regulated by means of a motor, or energy can be generated from the angular change of all the hull elements.

The invention is explained in the above with reference to embodiments. A number of other variants may be envisaged within the scope of the invention as it is defined in the following claims. Motors for implementing angular change between the hull elements may be any suitable type of motor. It may also consist of a unit that converts the electricity from batteries to rotational energy for rotation of the eccentric arm. The row of hull elements for recovery of energy in a flowing fluid may, for example, be attached to anchor chains or a signal buoy mooring where the generated energy is transferred to batteries provided in the surface buoy.

What is claimed is:

1. A system for utilisation of a sinusoidal pattern of movement for propulsion comprising a plurality of rigid hull elements (1), at least partly submerged, arranged in a row, rotatably interconnected for rotation about parallel axes of rotation across the longitudinal direction of the row of hull elements, and movement devices (2) for rotating substantially the whole row of hull elements relative to one another, wherein the row of hull elements (1) comprises a vessel (3), and wherein at least one of the hull elements (1) comprise a watertight chamber, and wherein energy for operating the movement devices (2) is provided by an internal energy source, whereby propulsion of the vessel (3) is achieved completely or partly by induced rotation of the hull elements (1) relative to one another, and further wherein the sinusoidal pattern of movement is created by means of angular changes between the hull elements (1) and is in a plane substantially parallel to the surface of the water, and that the row of hull elements (1) forms a complete sinus wave, and the row comprises at least 4 hull elements (1) behind one another and that the hull elements have a substantially constant cross sectional area over the length of the row of hull elements, and where the hull elements (1) have rigid sides with an open space inside, thus forming a shell structure.

2. A system according to claim 1, wherein the amplitude of the sinusoidal pattern of movement that is created by the angular change between the hull elements increases linearly over the length of the row of hull elements (1).

3. A system according to claim 2, wherein the last hull element (1) in the row, the tail (12), preferably has an oscillation amplitude of 6–20% of the length of the row of hull elements.

4. A system according to claim 1, wherein the amplitude of the sinusoidal pattern of movement that is created by the angular change between the hull elements increases exponentially over the length of the row of hull elements (1).

5. A system for utilisation of a sinusoidal pattern of movement for energy recovery, comprising a plurality of rigid hull elements (1), at least partly submerged, arranged in a row, rotatably interconnected for rotation about parallel axes of rotation across the longitudinal direction of the row of hull elements, and movement devices (2) for recovery of energy as a result of rotation of substantially the whole row of hull elements relative to one another, wherein the row of hull elements (1) is located in a substantially unidirectionally flowing fluid, the first hull element (1) is anchored to a stable unit, the other hull elements (1) are floating freely in the fluid flow, whereby on movement of the hull elements (1) relative to one another, the movement devices (2) convert this motion to energy, which can be transferred from the hull elements (1) to an operational site of use, and further wherein the sinusoidal pattern of movement is created by means of angular changes between the hull elements (1) and is in a plane substantially parallel to the surface of the water and that the row of hull elements (1) forms a complete sinus wave, and the row comprises at least 4 hull elements (1) behind one another and that the hull elements have a substantially constant cross sectional area over the length of the row of hull elements, and where the hull elements (1) have rigid sides with an open space inside, thus forming a shell structure.

6. A system according to claim 5, wherein at least one of the hull elements has a buoyancy unit.

7. A system according to claim 6, wherein the amplitude of the sinusoidal pattern of movement that is created by the angular change between the hull elements increases linearly over the length of the row of hull elements (1).

8. A system according to claim 7, wherein the last hull element (1) in the row, the tail (12), preferably has an oscillation amplitude of 6–20% of the length of the row of hull elements.

9. A system according to claim 6, wherein the amplitude of the sinusoidal pattern of movement that is created by the angular change between the hull elements increases exponentially over the length of the row of hull elements (1).

10. A system according to claim 5, wherein at least one of the hull elements has a weight unit.

11. A system for utilisation of a sinusoidal pattern of movement for propulsion comprising a plurality of rigid hull elements (1), at least partly submerged, arranged in a row, rotatably interconnected for rotation about parallel axes of rotation across the longitudinal direction of the row of hull elements, and movement devices (2) for rotating substantially the whole row of hull elements relative to one another, wherein the row of hull elements (1) is rotatably attached to a vessel (3), and wherein at least one of the hull elements (1) comprise a watertight chamber, and wherein energy for operating the movement devices (2) is provided by an internal energy source, whereby propulsion of the vessel (3) is achieved completely or partly by induced rotation of the hull elements (1) relative to one another, and further wherein the sinusoidal pattern of movement is created by means of angular changes between the hull elements (1) and is in a plane substantially parallel to the surface of the water, and that the row of hull elements (1) forms a complete sinus wave, and the row comprises at least 4 hull elements (1) behind one another and that the hull elements have a substantially constant cross sectional area over the length of the row of hull elements, and where the hull elements (1) have rigid sides with an open space inside, thus forming a shell structure.

12. A system according to claim 11, wherein the amplitude of the sinusoidal pattern of movement that is created by the angular change between the hull elements increases linearly over the length of the row of hull elements (1).

13. A system according to claim 11, wherein the amplitude of the sinusoidal pattern of movement that is created by the angular change between the hull elements increases exponentially over the length of the row of hull elements (1).

14. A system according to claim 12 or 13, wherein the last hull element (1) in the row, the tail (12), preferably has an oscillation amplitude of 6–20% of the length of the row of hull elements.

* * * * *